United States Patent
Heo (10) Patent No.: US 11,904,957 B2
(45) Date of Patent: Feb. 20, 2024

(54) RACK-DRIVEN STEERING DEVICE

(71) Applicant: HL MANDO CORPORATION, Gyeonggi-do (KR)

(72) Inventor: Seong Moo Heo, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 210 days.

(21) Appl. No.: 17/355,585

(22) Filed: Jun. 23, 2021

(65) Prior Publication Data
US 2021/0394819 A1    Dec. 23, 2021

(30) Foreign Application Priority Data

Jun. 23, 2020 (KR) .................. 10-2020-0076390

(51) Int. Cl.
*B62D 5/04* (2006.01)
*F16H 19/02* (2006.01)

(52) U.S. Cl.
CPC ........... *B62D 5/0448* (2013.01); *F16H 19/02* (2013.01)

(58) Field of Classification Search
CPC ......... B62D 5/0448; B62D 5/04; F16H 19/02; F16H 19/00
See application file for complete search history.

(56) References Cited

FOREIGN PATENT DOCUMENTS

WO    WO-2004014713 A1 *  2/2004  ............... B62D 5/04

OTHER PUBLICATIONS

Machine Translation of WO2004014713A1 PDF File Name: "WO2004014713A1_Machine_Translation.pdf".*

* cited by examiner

*Primary Examiner* — Grant Moubry
*Assistant Examiner* — Ruben Picon-Feliciano
(74) *Attorney, Agent, or Firm* — Ladas & Parry, LLP

(57) ABSTRACT

According to embodiments, there may be provided a rack-driven steering device, comprising a ball nut coupled with a ball screw via balls and rotating to slide the ball screw, a ball nut gear provided on an outer circumferential surface of the ball nut, a motor gear provided on a shaft of a motor providing driving force to the ball nut and disposed in parallel with the ball screw, and a middle gear coupled between the ball nut gear and the motor gear and transferring the driving force from the motor.

19 Claims, 10 Drawing Sheets

RACK-DRIVEN STEERING DEVICE

CROSS-REFERENCE TO RELATED APPLICATION

This application claims priority from Korean Patent Application No. 10-2020-0076390, filed on Jun. 23, 2020, which is hereby incorporated by reference for all purposes as if fully set forth herein.

BACKGROUND

Field

Embodiments of the disclosure relate to a rack-driven steering device and, more specifically, to a rack-driven steering device that may stably transfer the power from the motor through the middle gear to the ball nut and the ball screw while compensating for the clearance between gears and reducing operational noise.

Description of Related Art

Rack-driven steering devices, e.g., rack-mounted motor-driven steering devices, are developed and adopted for power steering in aid of drivers' steering.

Recent steer-by-wire (SBW) systems do away with mechanical/physical linkages between the steering wheel and the front wheels, using a motor instead to steer the vehicle.

Conventional rack-driven steering devices suffer from unstable transfer of power from the motor, failures, noise, and low durability. In particular, SBW systems, which lack mechanical connection between the steering wheel and the front wheels, may put the driver at risk if failing in stable transmission of motor power. Therefore, a need exists for addressing these issues.

BRIEF SUMMARY

Embodiments of the disclosure aim to provide a rack-driven steering device that may stably transfer the power from the motor through the middle gear to the ball nut and the ball screw while compensating for the clearance between gears and reducing operational noise.

The objects of the present embodiments are not limited to the foregoing and other objects will be apparent to one of ordinary skill in the art from the following detailed description.

According to embodiments, there may be provided a rack-driven steering device, comprising a ball nut coupled with a ball screw via balls and rotating to slide the ball screw, a ball nut gear provided on an outer circumferential surface of the ball nut, a motor gear provided on a shaft of a motor providing driving force to the ball nut and disposed in parallel with the ball screw, and a middle gear coupled between the ball nut gear and the motor gear and transferring the driving force from the motor.

As described above, according to various embodiments, in the rack-driven steering device, it is possible to stably transfer the power from the motor through the middle gear to the ball nut and the ball screw while compensating for the clearance between gears and reducing operational noise.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Hereinafter, embodiments of the disclosure are described in detail with reference to the accompanying drawings. The same or substantially the same reference denotations are used to refer to the same or substantially the same elements throughout the specification and the drawings. When determined to make the subject matter of the disclosure unclear, the detailed description of the known configurations or functions may be skipped.

Such denotations as "first," "second," "A," "B," "(a)," and "(b)," may be used in describing the components of the disclosure. These denotations are provided merely to distinguish a component from another, and the essence of the components is not limited by the denotations in light of order or sequence. When a component is described as "connected," "coupled," or "linked" to another component, the component may be directly connected or linked to the other component, but it should also be appreciated that other components may be "connected," "coupled," or "linked" between the components.

Figure 1:
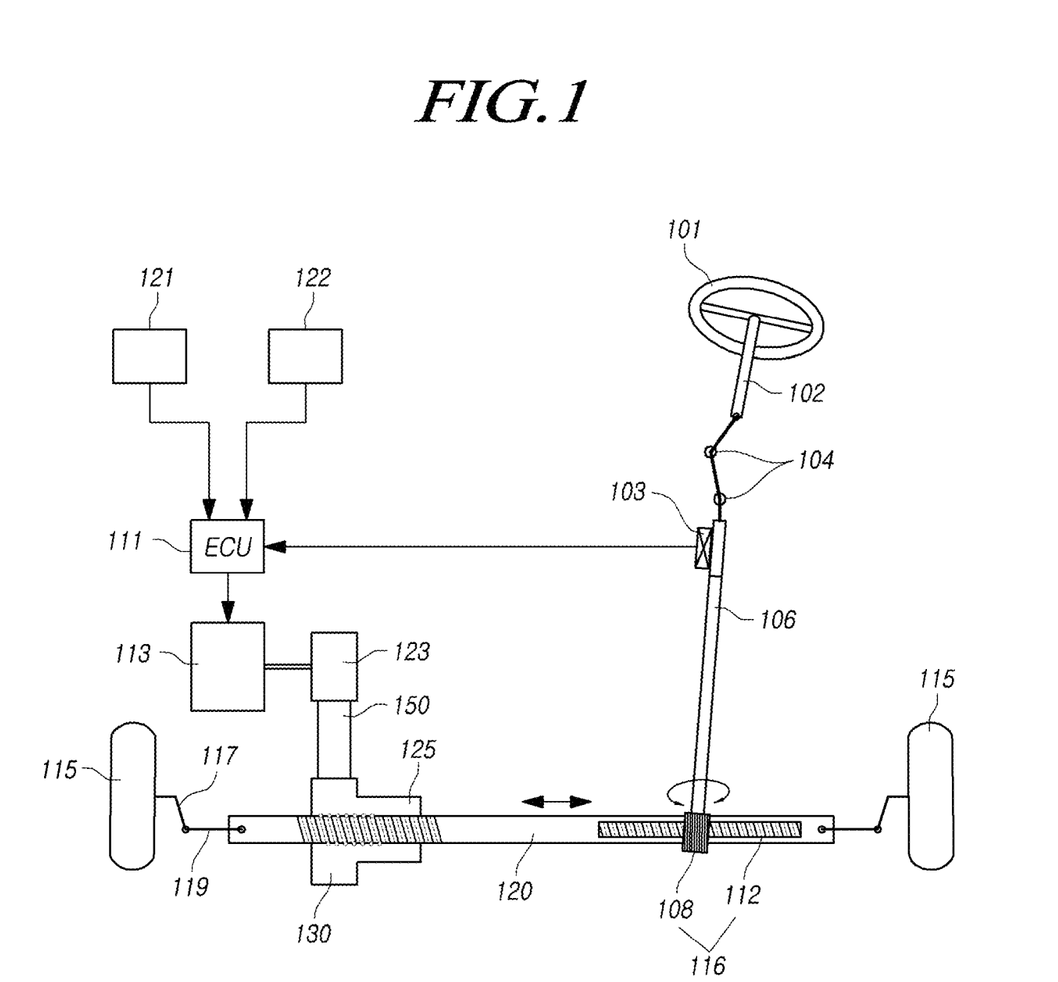
FIGS. 1 and 2 are views schematically illustrating a configuration of a rack-driven steering device according to an embodiment.
Figure 2:
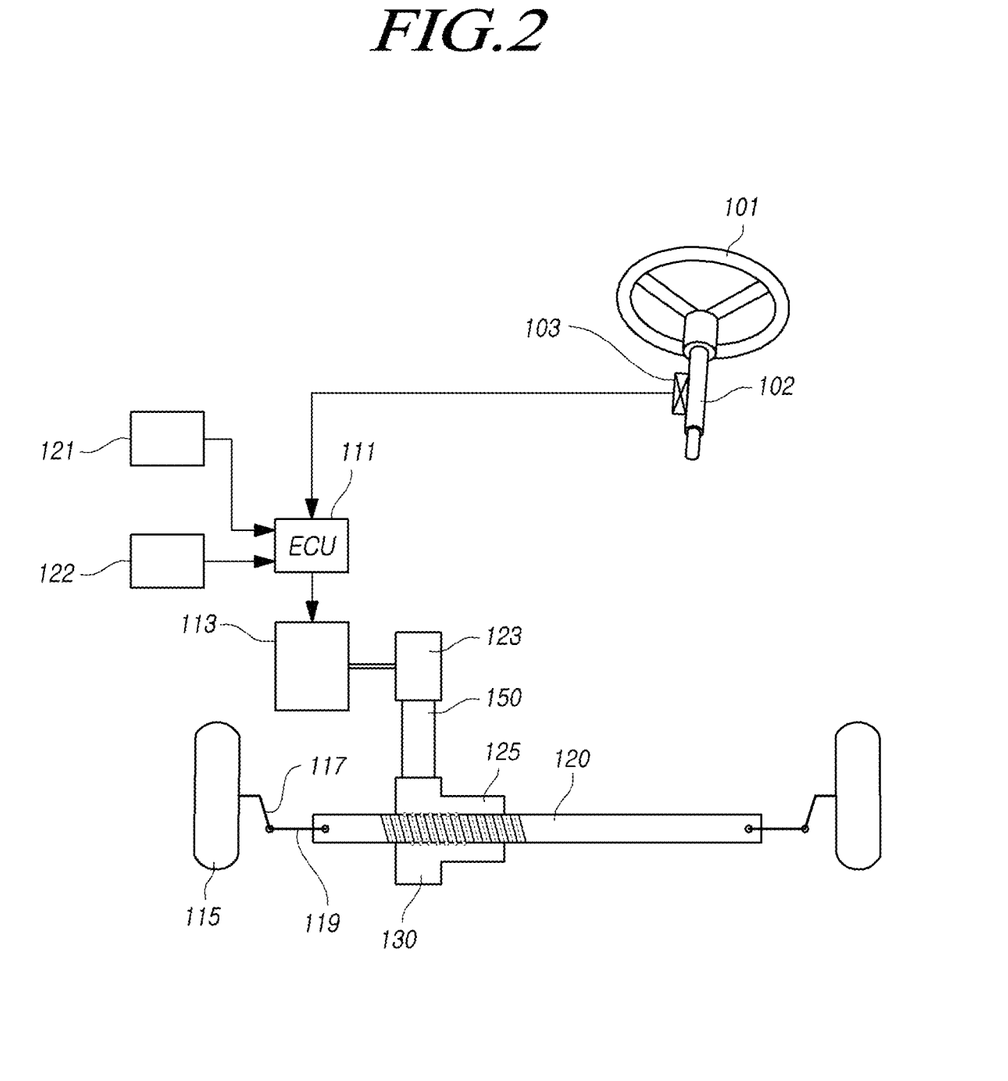
Figure 3:
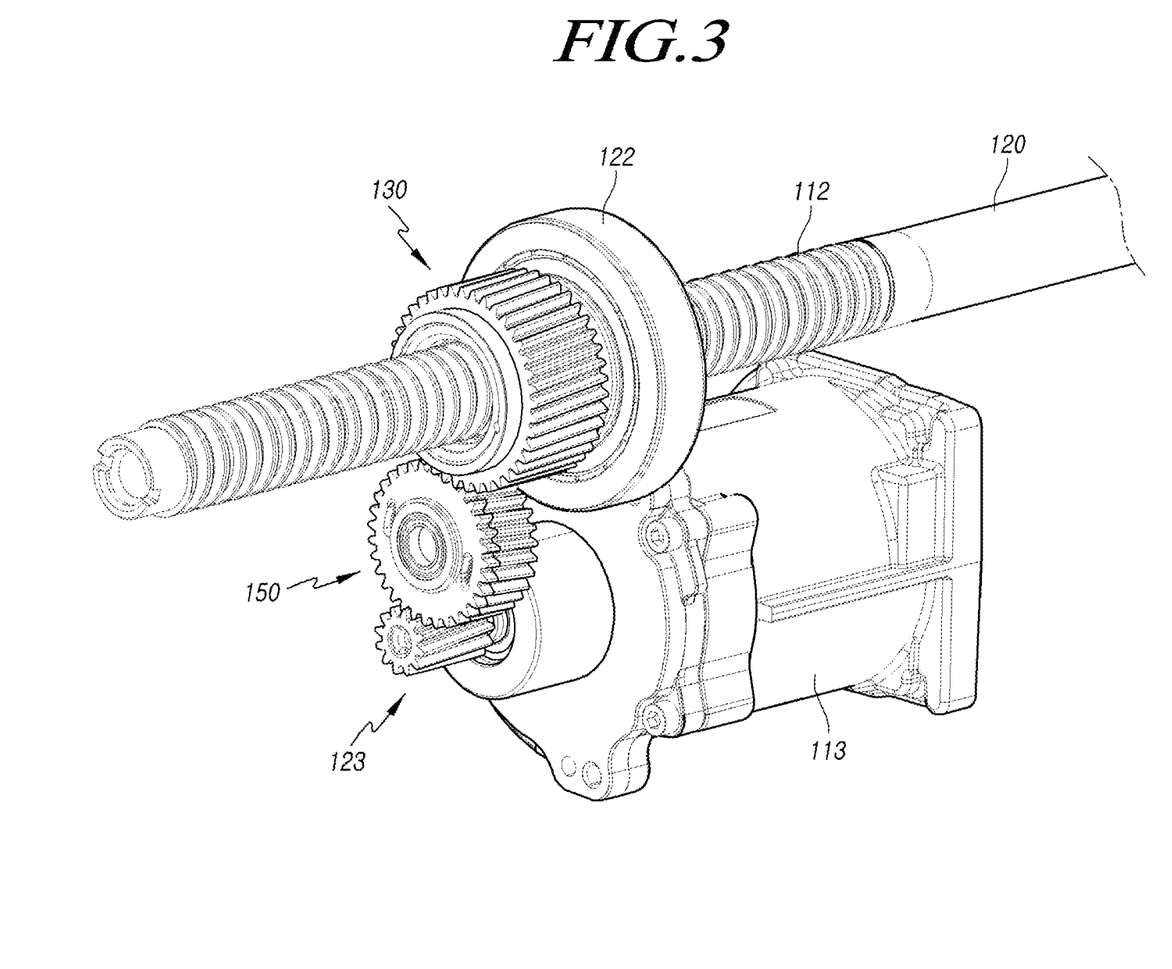
FIG. 3 is a perspective view illustrating part of a rack-driven steering device according to an embodiment.
Figure 8:
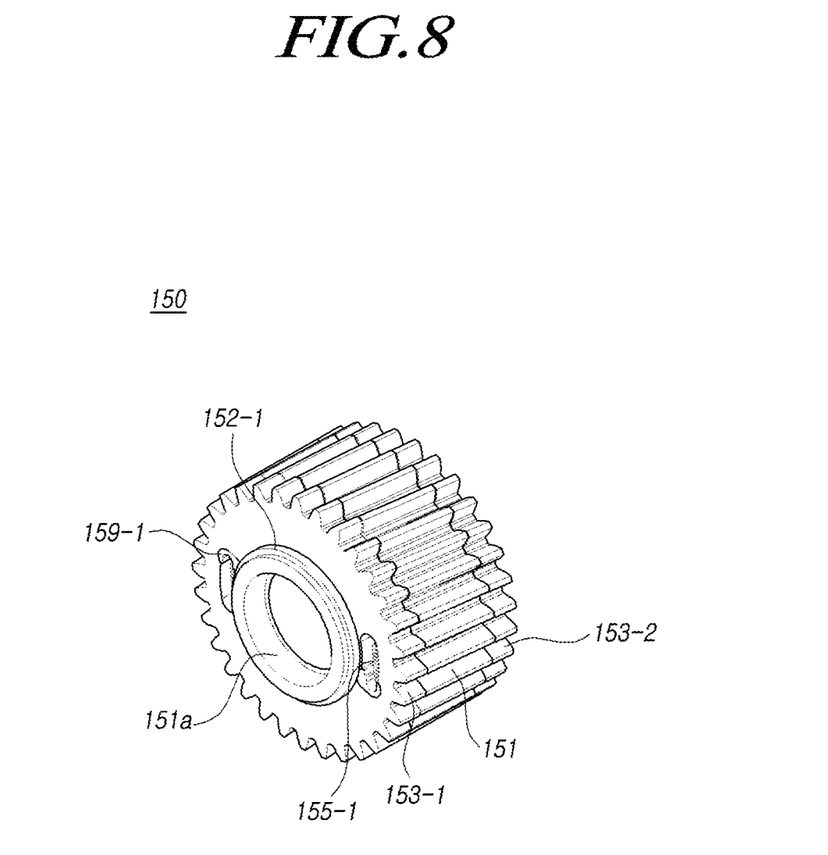
FIG. 8 is a perspective view illustrating part of a rack-driven steering device according to an embodiment.
Figure 9:
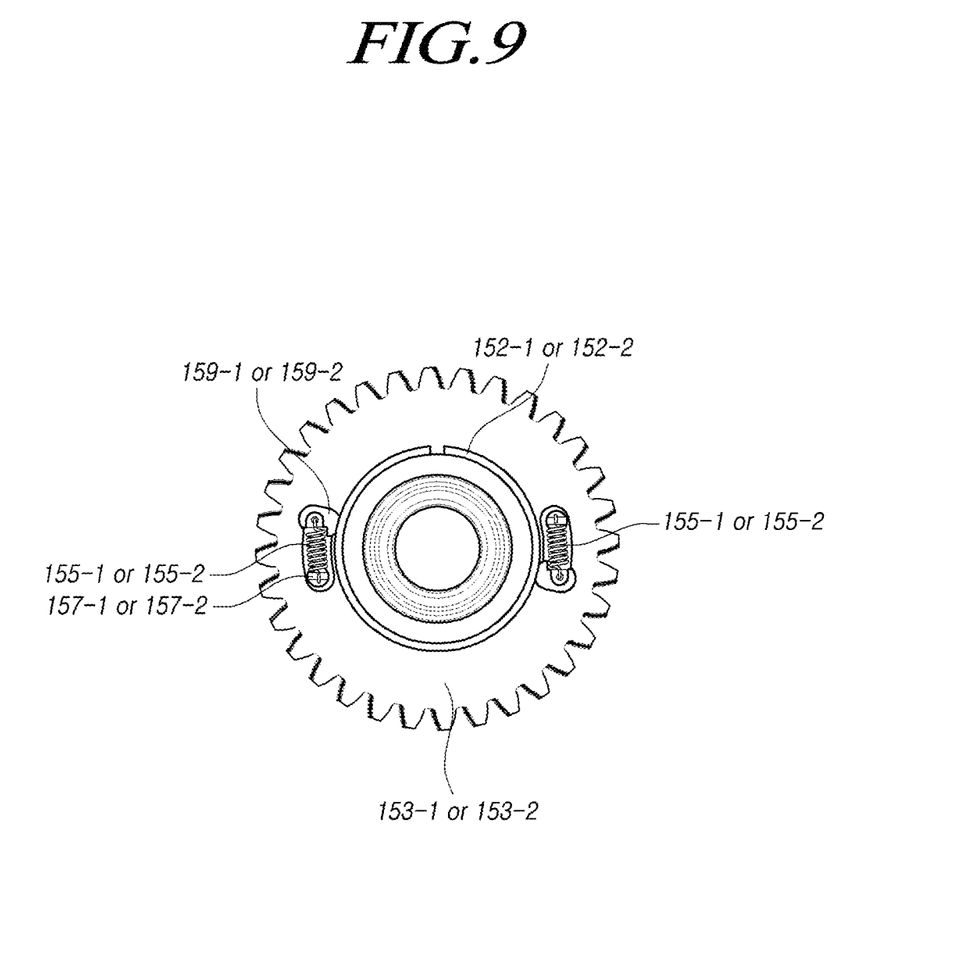
FIG. 9 is a front view illustrating part of a rack-driven steering device according to an embodiment.
Figure 10:
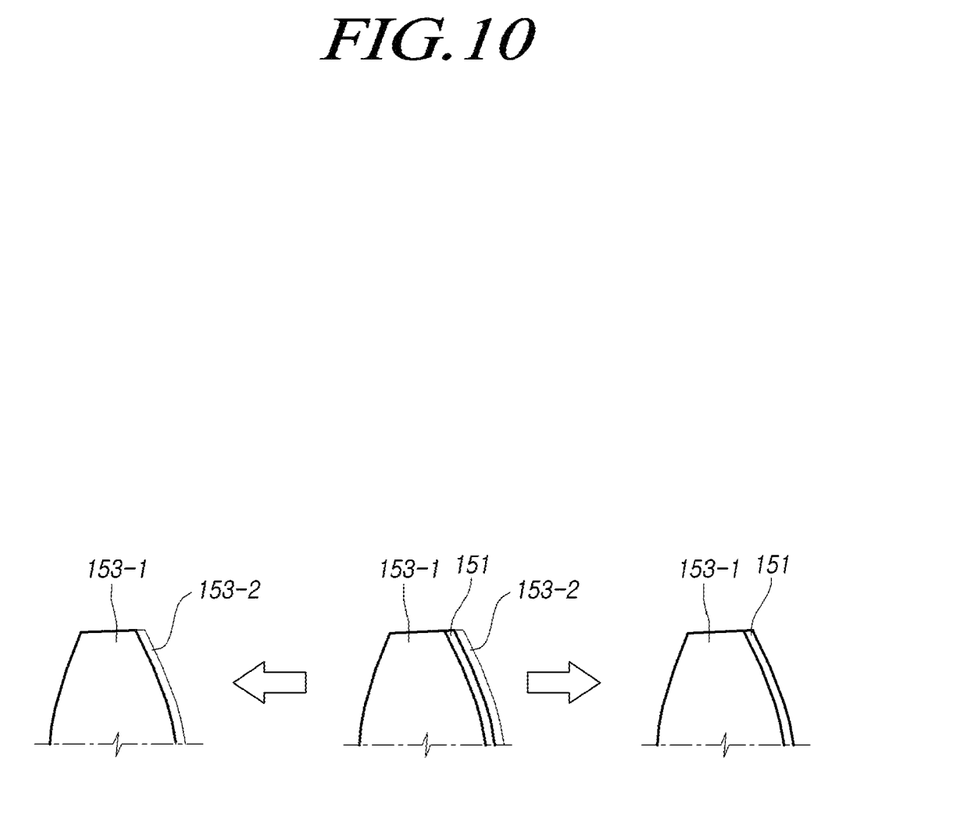
FIG. 10 is a view illustrating an operational state of a rack-driven steering device according to an embodiment.

FIGS. 1 and 2 are views schematically illustrating a configuration of a rack-driven steering device according to an embodiment. FIG. 3 is a perspective view illustrating part of a rack-driven steering device according to an embodiment. FIGS. 4, 5, 6, and 7 are exploded perspective views illustrating part of a rack-driven steering device according to an embodiment. FIG. 8 is a perspective view illustrating part of a rack-driven steering device according to an embodiment. FIG. 9 is a front view illustrating part of a rack-driven steering device according to an embodiment. FIG. 10 is a view illustrating an operational state of a rack-driven steering device according to an embodiment.

Referring to the drawings, according to an embodiment, a rack-driven steering device includes a ball nut 125 coupled with a ball screw 120 via balls and rotating to slide the ball screw 120, a ball nut gear 130 provided on an outer circumferential surface of the ball nut 125, a motor gear 123 provided on a shaft 113a of a motor 113 providing driving power to the ball nut 125 and disposed in parallel with the ball screw 120, and a middle gear 150 coupled between the ball nut gear 130 and the motor gear 123 to transfer driving power from the motor 113.

In the rack-driven steering device according to an embodiment, a torque sensor 103 is coupled to one side of steering shafts 102 and 106 connected with a steering wheel 101. The driver's manipulation of the steering wheel 101 is detected by the torque sensor 103, a steering angle sensor 121, or a vehicle speed sensor 122, and the resultant electric signal is transmitted to the motor 113 to steer wheels 115 via tie rods 119.

In the rack-driven steering device illustrated in FIG. 1, the upper steering shaft 102 is connected to the lower steering shaft 106 via a universal joint 104, and steering is performed via a rack-pinion mechanism 116 including a pinion 108 and a rack gear 112. The rack-driven steering device illustrated in FIG. 2 is a steering device adopting a SBW system which performs steering using a motor 113 without a mechanical connection to the steering shaft 102.

The driving power from the motor 113 driven by an electronic control unit (ECU) 111 is delivered via, e.g., the motor gear 123, middle gear 150, ball nut gear 130, ball nut 125, and ball screw 120. The tie rods 119 are coupled to two opposite sides of the ball screw 120, and knuckle arms 117 connected with the wheels 115 are coupled to the tie rods 119 to steer the wheels 115.

The electric signal generated from the torque signal 103 is sent to the ECU 111, and the ECU 111 controls the motor 113 based on the electric signal received from the torque sensor 103 and the electric signals received from the steering angle sensor 121 and the vehicle speed sensor 122 mounted to the vehicle.

Although it is illustrated in the drawings that one ball screw 120 steers the two wheels 115 for ease of description, embodiments of the disclosure are not limited thereto. According to an embodiment, one ECU 111 receiving electric signals from the torque sensor 103 and other various sensors may transmit two motors 113, and each motor 113 may steer one ball screw 120 and one wheel 115. No detailed description thereof is given.

The motor gear 123 is coupled to the shaft 113a of the motor 113, the ball nut gear 130 is coupled to the ball nut 125, and the middle gear 150 is coupled between the motor gear 123 and the ball nut gear 130 so that the driving power from the motor 113 is transferred to the ball nut 125 via the middle gear 150, thereby rotating the ball nut 125.

As the ball nut 125 is rotated by the driving power from the motor 113, the ball screw 120 coupled to the ball nut 125 via balls are axially slid so that steering is performed via the tie rods 119.

An outer thread 112 is formed on the outer circumferential surface of the ball screw 120 to allow the balls to circulate therearound, and an inner thread corresponding to the outer thread 112 is formed on the inner circumferential surface of the ball nut 125, so that the ball nut 125 is coupled with the ball screw 120 via the balls inserted between the outer thread 112 and the inner thread.

Accordingly, as the ball nut 125 rotates, the ball screw 120 axially slides.

Figure 4:
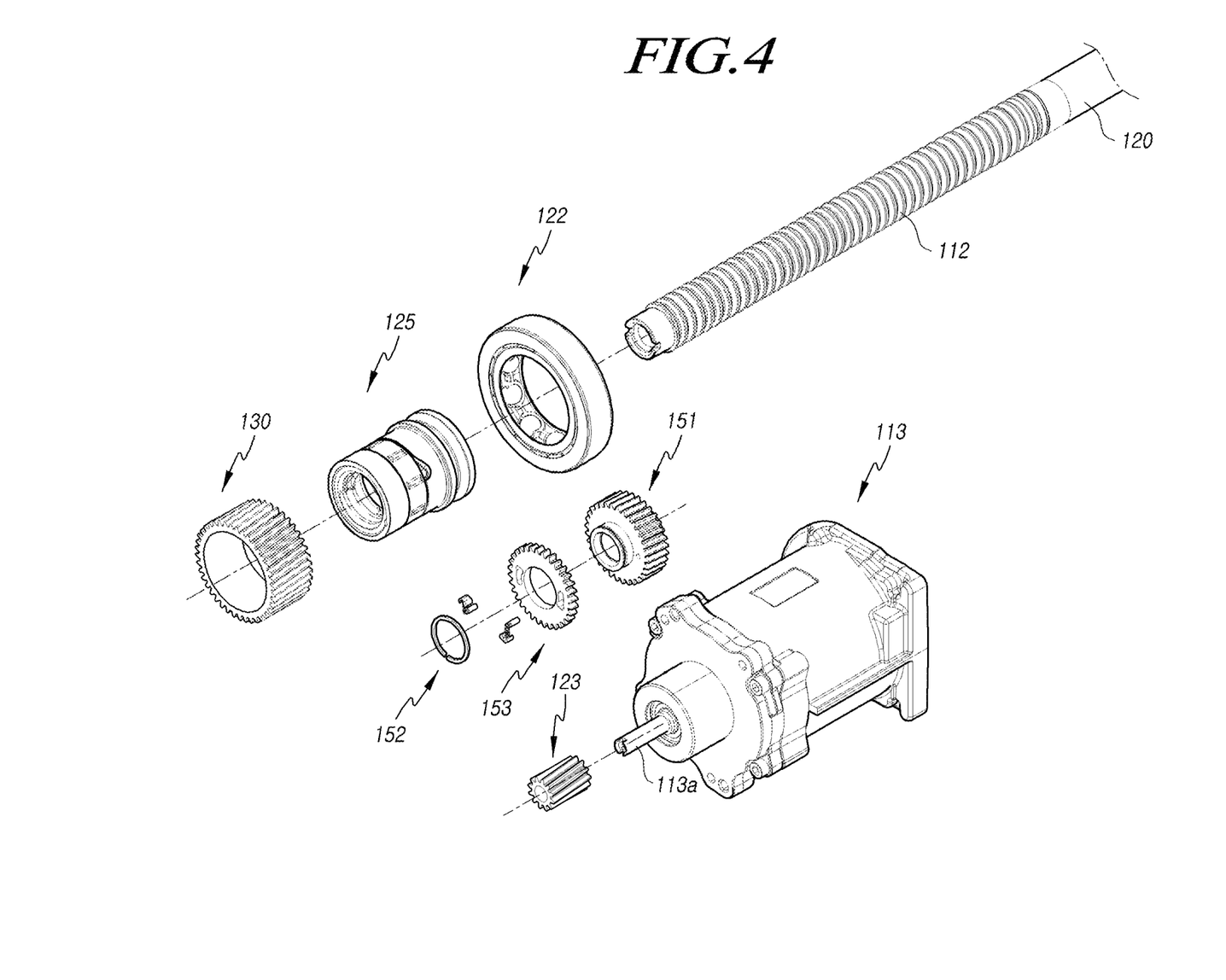
FIGS. 4, 5, 6, and 7 are exploded perspective views illustrating part of a rack-driven steering device according to an embodiment.
Figure 5:
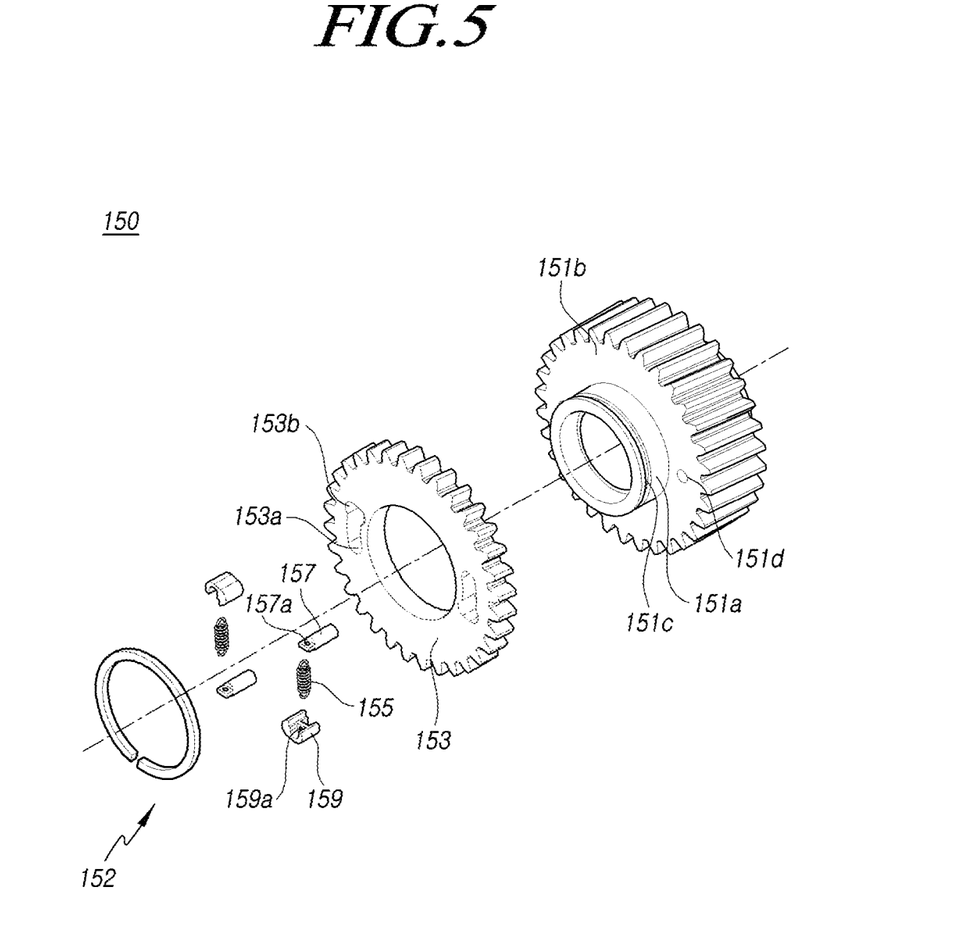
Figure 6:
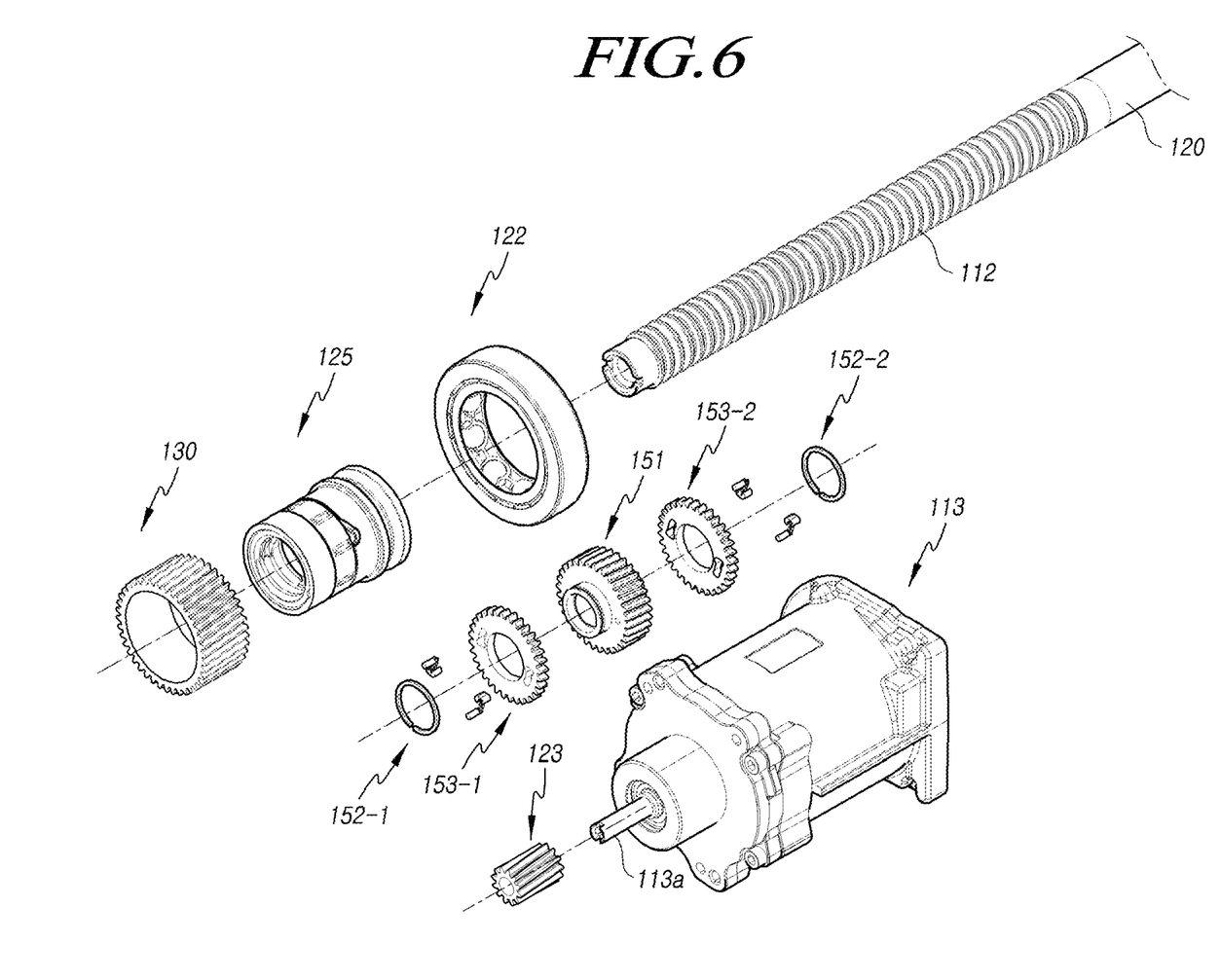
Figure 7:
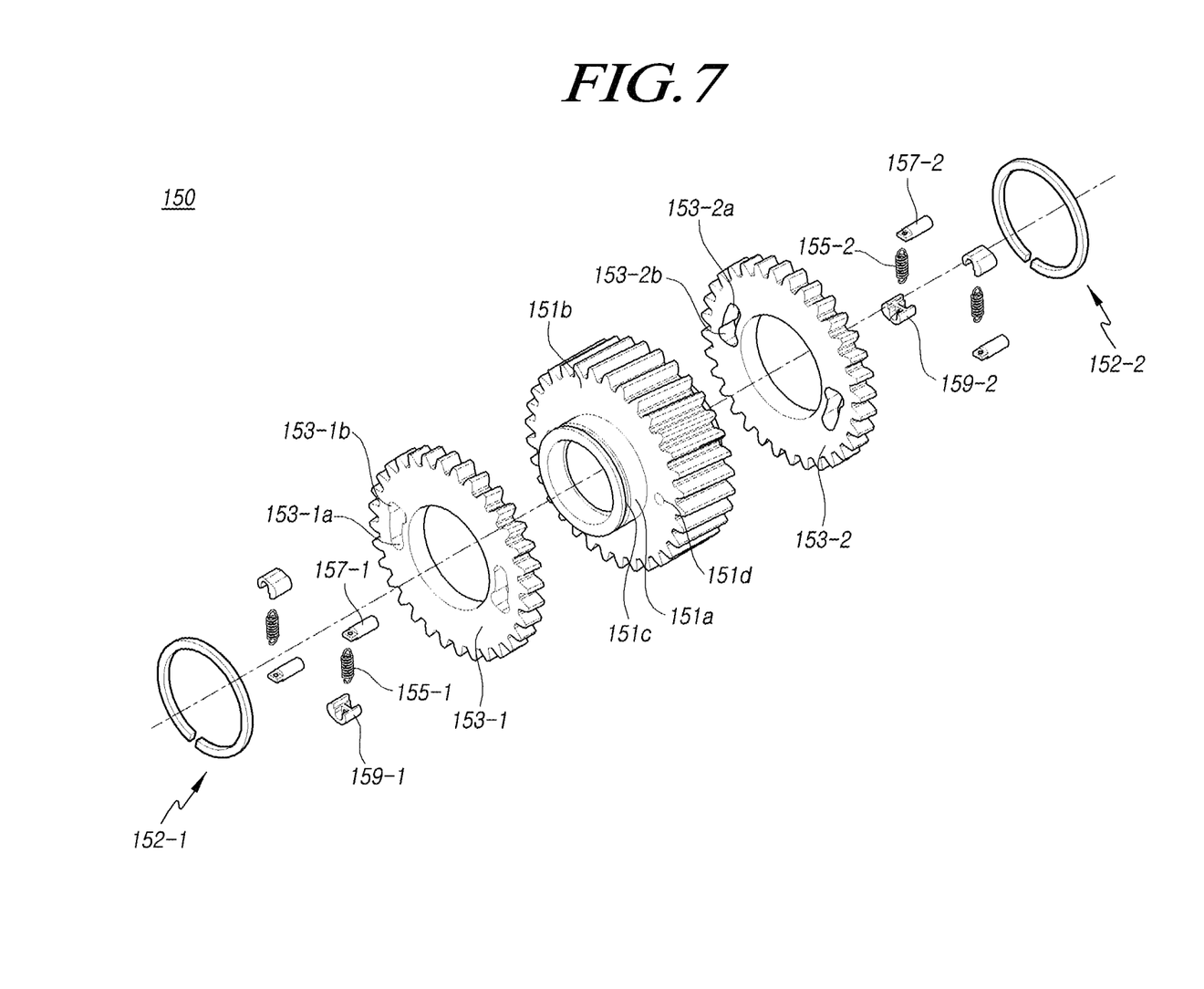

Referring to FIGS. 3 to 5, the middle gear 150 coupled between the ball nut gear 130 and the motor gear 123 to transfer the driving power from the motor 113 includes a main gear 151 having main gear teeth formed on the outer circumferential surface thereof, which are engaged with the ball nut gear 130 and the motor gear 123 to transfer driving power, and a sub gear 153 formed with sub gear teeth having the same shape as the main gear teeth and disposed, on one side of the main gear 151 in the axial direction, to rotate in the circumferential direction of the main gear teeth.

The main gear 151 includes a cylindrical cylinder part 151a axially elongated and a gear part 151b having an enlarged diameter at a middle spaced apart from two opposite axial ends of the cylinder part 151a and having the main gear teeth formed on the outer circumferential surface thereof. The sub gear 153 is smaller in axial thickness than the main gear 151.

A fixing member 152 is coupled to one end of the cylinder part 151a to axially support the sub gear 153, preventing the sub gear 153 from escaping off.

A fixing groove 151c is formed in the outer circumferential surface of an end of the cylinder part 151a to allow the fixing member 152 to fit over the fixing groove 151c. The fixing member 152 is shaped as an open ring.

The middle gear 150 further includes elastic members 155 each of which has two opposite lateral ends individually coupled to the main gear 151 and the sub gear 153 to provide elastic force in the circumferential direction.

The elastic member 155 is a compression coil spring that is coupled to be compressed when the gear teeth of the main gear 151 and the sub gear 153 are aligned with each other and to generate elastic restorative force in the direction in which the sub gear 153 is misaligned from the main gear 151.

The middle gear 150 may further include fixing pins 157 fixed to the main gear 151 and holders 159 fixed to the sub gear 153. One end of the elastic member 155 is coupled to the fixing fin 157, and the opposite end of the elastic member 155 is coupled to the holder 159.

The fixing pin 157 has a fixing hole 157a into which one end of the elastic member 155 is fitted, and the holder 159 has a fixing hole 159a into which the opposite end of the elastic member 155 is fitted.

One axial end of the main gear 151 has support holes 151d into which the fixing pins 157 are fitted, and the fixing pins 157 are thereby fastened to the main gear 151.

The sub gear 153 has operation holes 153a that communicate with the support holes 151d of the main gear 151 and extend in the circumferential direction to allow the holders 159 to fit thereinto, and the holders 159 are thereby fastened to the sub gear 153.

Therefore, when the main gear 151 is coupled to the sub gear 153, two opposite ends of each elastic member 155 are supported by the fixing pin 157 and the holder 159 while providing elastic force to the main gear 151 and the sub gear 153 in the circumferential direction.

The operation hole 153a is formed in an arc shape extending in the circumferential direction. The operation hole 153a has a hole 153b radially expanded at an end spaced apart from the support hole 151d in the circumferential direction. The holder 159 is fitted into the expanded hole 153b and is thus prevented from escaping off.

Referring to FIGS. 6 to 10, a middle gear 150 may include a main gear 151 having main gear teeth formed on the outer circumferential surface thereof, which are engaged with the gear teeth of the ball nut gear 130 and the motor gear 123 to transfer driving force, a first sub gear 153-1 formed with sub gear teeth having the same shape as the main gear teeth and disposed on one axial side of the main gear 151 to rotate in a circumferential direction of the main gear teeth, and a second sub gear 153-2 formed with sub gear teeth having the same shape as the main gear teeth and disposed on the opposite axial side of the main gear 151 to rotate in the opposite circumferential direction of the main gear teeth.

The main gear 151 includes a cylindrical cylinder part 151a axially elongated and a gear part 151b having an enlarged diameter at a middle spaced apart from two opposite axial ends of the cylinder part 151a and having the main gear teeth formed on the outer circumferential surface thereof. The first sub gear 153-1 and the second sub gear 153-2 are smaller in axial thickness than the main gear 151.

A first fixing member 152-1 is coupled to one end of the cylinder part 151a to axially support the first sub gear 153-1, and a second fixing member 152-2 is coupled to the opposite end of the cylinder part 151a to axially support the second sub gear 153-2, preventing the first sub gear 153-1 and the second sub gear 153-2 from escaping off.

A first fixing groove 151c is formed in the outer circumferential surface of one end of the cylinder part 151a to allow the first fixing member 152-1 to fit thereinto, and a second fixing groove (not shown) is formed in the outer circumferential surface of the opposite end of the cylinder part 151a to allow the second fixing member 152-2 to fit thereinto.

The second fixing groove and the first fixing groove 151c have the same shape and are symmetrically formed on two opposite sides of the cylinder part 151a. The first fixing members 152-1 and the second fixing member 152-2 are shaped as open rings.

The middle gear 150 includes first elastic members 155-1 and second elastic members 155-2. One end of each first elastic member 155-1 is coupled to one side of the main gear 151, and the opposite side thereof is coupled to the first sub gear 153-1, providing elastic force in one circumferential direction. One end of each second elastic member 155-2 is coupled to the opposite side of the main gear 151, and the opposite end thereof is coupled to the second sub gear 153-2, providing elastic force in the opposite circumferential direction.

Thus, the first elastic member 155-1 and the second elastic member 155-2 are coupled to generate elastic restorative forces in opposite directions.

The middle gear 150 may include first fixing pins 157-1, first holders 159-1, second fixing pins 157-2, and second holders 159-2. The first fixing pin 157-1 is fixed to one side of the main gear 151 and is coupled with one end of the first elastic member 155-1. The first holder 159-1 is fixed to the first sub gear 153-1 and is coupled with the opposite end of the first elastic member 155-1. The second fixing pin 157-2 is fastened to the opposite side of the main gear 151 and is coupled with one end of the second elastic member 155-2. The second holder 159-2 is fastened to the second sub gear 153-2 and is coupled with the opposite end of the second elastic member 155-2.

One axial end of the main gear 151 has first support holes 151d into which the first fixing pins 157-1 are fitted, and the opposite axial end of the main gear 151 has second support holes (not shown) into which the second fixing pins 157-2 are fitted.

The first sub gear 153-1 has first operation holes 153-1a that communicate with the first support holes 151d and are formed in the circumferential direction to allow the first holders 159-1 to be fitted thereinto. The second sub gear 153-2 has second operation holes 153-2a that communicate with the second support holes and are formed in the circumferential direction to allow the second holders 159-2 to be fitted thereinto.

The first operation hole 153-1a has a first expanded hole 153-1b radially expanded at an end spaced apart from the first support hole 151d in the circumferential direction to allow the first holder 159-1 to be fitted thereinto. The second operation hole 153-2a has a second expanded hole 153-2b radially expanded at an end spaced apart from the second support hole in the circumferential direction to allow the second holder 159-2 to be fitted thereinto.

If the first elastic member 155-1 provides elastic force clockwise, the second elastic member 155-2 provides elastic force counterclockwise, generating elastic restorative forces in the direction along which the first sub gear 153-1 is clockwise misaligned from the main gear 151, and the second sub gear 153-2 is counterclockwise misaligned from the main gear 151.

Referring to FIG. 10 illustrating a state in which the middle gear 150 rotates, if the middle gear 150 is rotated clockwise in the state in which the first sub gear 153-1 and the second sub gear 153-2 are misaligned with the main gear 151 in two opposite circumferential directions (the middle of FIG. 10), the second sub gear 153-2 is forced counterclockwise while being supported at its right side by the opposite gears (e.g., the ball nut gear and the motor gear) and is thus aligned with the main gear 151 as illustrated on the right of FIG. 10 and, if further rotated, the second sub gear 153-2 is spaced apart from the opposite gears and misaligned back.

Conversely, when the middle gear 150 rotates counterclockwise, the first sub gear 153-1 is forced clockwise while being supported at its left side by the opposite gears (e.g., the ball nut gear and the motor gear) and is thus aligned with the main gear 151 as illustrated on the left of FIG. 10 and, if further rotated, the first sub gear 153-1 is spaced apart from the opposite gears and misaligned back.

Accordingly, when the middle gear 150 is rotated while meshing with the ball nut gear 130 and the motor gear 123, the first sub gear 153-1 and the second sub gear 153-2 compensate for the play. The first elastic member 155-1 and the second elastic member 155-2 absorb the contact impact at the moment they are meshed with each other and come into contact with the opposite gears (the ball nut gear and the motor gear), thereby reducing operating noise.

As described above, according to various embodiments, in the rack-driven steering device, it is possible to stably transfer the power from the motor through the middle gear to the ball nut and the ball screw while compensating for the clearance between gears and reducing operational noise.

Although it is described above that all of the components are combined into one or are operated in combination, embodiments of the disclosure are not limited thereto. One or more of the components may be selectively combined and operated as long as it falls within the scope of the objects of the embodiments.

The above-described embodiments are merely examples, and it will be appreciated by one of ordinary skill in the art various changes may be made thereto without departing from the scope of the disclosure. Accordingly, the embodiments set forth herein are provided for illustrative purposes, but not to limit the scope of the disclosure, and should be appreciated that the scope of the disclosure is not limited by the embodiments. The scope of the disclosure should be construed by the following claims, and all technical spirits within equivalents thereof should be interpreted to belong to the scope of the disclosure.

What is claimed is:
1. A rack-driven steering device, comprising:
 a ball nut coupled with a ball screw via balls and rotating to slide the ball screw;
 a ball nut gear provided on an outer circumferential surface of the ball nut;
 a motor gear provided on a shaft of a motor providing driving force to the ball nut and disposed in parallel with the ball screw; and
 a middle gear coupled between the ball nut gear and the motor gear and transferring the driving force from the motor,
 wherein the middle gear includes:

a main gear having main gear teeth formed on an outer circumferential surface thereof and engaged with gear teeth of the ball nut gear and the motor gear to transfer the driving force; and a sub gear formed with sub gear teeth having the same shape as the main gear teeth and disposed on an axial side of the main gear to rotate in a circumferential direction of the main gear teeth, and wherein the main gear includes:

a cylindrical cylinder part; and a gear part having an increased diameter at a center spaced apart from two opposite axial ends of the cylinder part and having the main gear teeth formed on an outer circumferential surface thereof.

2. The rack-driven steering device of claim 1, wherein a fixing member is coupled to an end of the cylinder part to axially support the sub gear.

3. The rack-driven steering device of claim 2, wherein a fixing groove is formed in an outer circumferential surface of an end of the cylinder part, and wherein the fixing member fits into the fixing groove.

4. The rack-driven steering device of claim 3, wherein the fixing member is shaped as an open ring.

5. The rack-driven steering device of claim 1, wherein the middle gear includes an elastic member having a first end coupled to the main gear and a second end coupled to the sub gear to provide elastic force in a circumferential direction thereof.

6. The rack-driven steering device of claim 5, wherein the middle gear includes:

a fixing pin fixed to the main gear and coupled with the first end of the elastic member; and a holder fixed to the sub gear and coupled with the second end of the elastic member.

7. The rack-driven steering device of claim 6, wherein one axial end of the main gear includes a support hole into which the fixing pin is fitted, and wherein the sub gear includes an operation hole communicating with the support hole and formed in the circumferential direction to allow the holder to be fitted thereinto.

8. The rack-driven steering device of claim 7, wherein the operation hole includes a radially expanded hole in the second end spaced apart from the support hole in the circumferential direction, and wherein the holder fits into the expanded hole.

9. The rack-driven steering device of claim 1, wherein the middle gear includes:

a main gear having main gear teeth formed on an outer circumferential surface thereof and engaged with gear teeth of the ball nut gear and the motor gear to transfer the driving force;

a first sub gear formed with sub gear teeth having the same shape as the main gear teeth and disposed on a first axial side of the main gear to rotate in a first circumferential direction of the main gear teeth; and a second gear formed with sub gear teeth having the same shape as the main gear teeth and disposed on a second axial side of the main gear to rotate in a second circumferential direction of the main gear teeth.

10. The rack-driven steering device of claim 9, wherein the main gear includes:

a cylindrical cylinder part; and a gear part having an increased diameter at a center spaced apart from two opposite axial ends of the cylinder part and having the main gear teeth formed on an outer circumferential surface thereof.

11. The rack-driven steering device of claim 10, wherein a first fixing member is coupled to a first end of the cylinder part to axially support the first sub gear, and a second fixing member is coupled to a second end of the cylinder part to axially support the second sub gear.

12. The rack-driven steering device of claim 11, wherein a first fixing groove is formed in an outer circumferential surface of the first end of the cylinder part, wherein the first fixing member fits into the first fixing groove, wherein a second fixing groove is formed in an outer circumferential surface of the second end of the cylinder part, and wherein the second fixing member fits into the second fixing groove.

13. The rack-driven steering device of claim 12, wherein the first fixing member and the second fixing member each are shaped as an open ring.

14. The rack-driven steering device of claim 9, wherein the middle gear further includes:

a first elastic member having a first end coupled to a first side of the main gear and a second end coupled to the first sub gear to provide elastic force in the first circumferential direction; and a second elastic member having a first end coupled to a second side of the main gear and a second end coupled to the second sub gear to provide elastic force in the second circumferential direction.

15. The rack-driven steering device of claim 14, wherein the middle gear further includes:

a first fixing pin fixed to the first side of the main gear and coupled with the first end of the first elastic member;

a first holder fixed to the first sub gear and coupled with the second end of the first elastic force;

a second fixing pin fixed to the second side of the main gear and coupled with the first end of the second elastic member; and a second holder fixed to the second sub gear and coupled with the second end of the second elastic member.

16. The rack-driven steering device of claim 15, wherein a first support hole is formed in a first axial end of the main gear to allow the first fixing pint to be fitted thereinto, and a second support hole is formed in a second axial end of the main gear to allow the second fixing pin to be fitted thereinto, and wherein the first sub gear has a first operation hole that communicates with the first support hole and is formed in the circumferential direction to allow the first holder to be fitted thereinto, and the second sub gear has a second operation hole that communicates with the second support hole and is formed in the circumferential direction to allow the second holder to be fitted thereinto.

17. The rack-driven steering device of claim 16, wherein the first operation hole includes a radially expanded first expanded hole in the second end spaced apart from the first support hole in the circumferential direction, and wherein the first holder fits into the first expanded hole, and wherein the second operation hole includes a radially expanded second expanded hole in the second end spaced apart from the second support hole in the circumferential direction, and wherein the second holder fits into the second expanded hole.

18. The rack-driven steering device of claim 9, wherein the first sub gear and the second sub gear are smaller in axial thickness than the main gear.

19. The rack-driven steering device of claim 1, wherein the ball nut gear has teeth on the outer circumferential surface of the ball nut gear, the motor gear has teeth on an outer circumferential surface of the motor gear provided on the shaft of the motor, and the middle gear has teeth on an outer circumferential surface the middle gear, the teeth of the middle gear engaged with the teeth of the ball nut gear and the teeth of the motor gear.

\* \* \* \* \*